June 11, 1935.     I. H. JUDD     2,004,437
TRUCK TRAILER COMBINATION
Original Filed Dec. 4, 1933    2 Sheets-Sheet 1
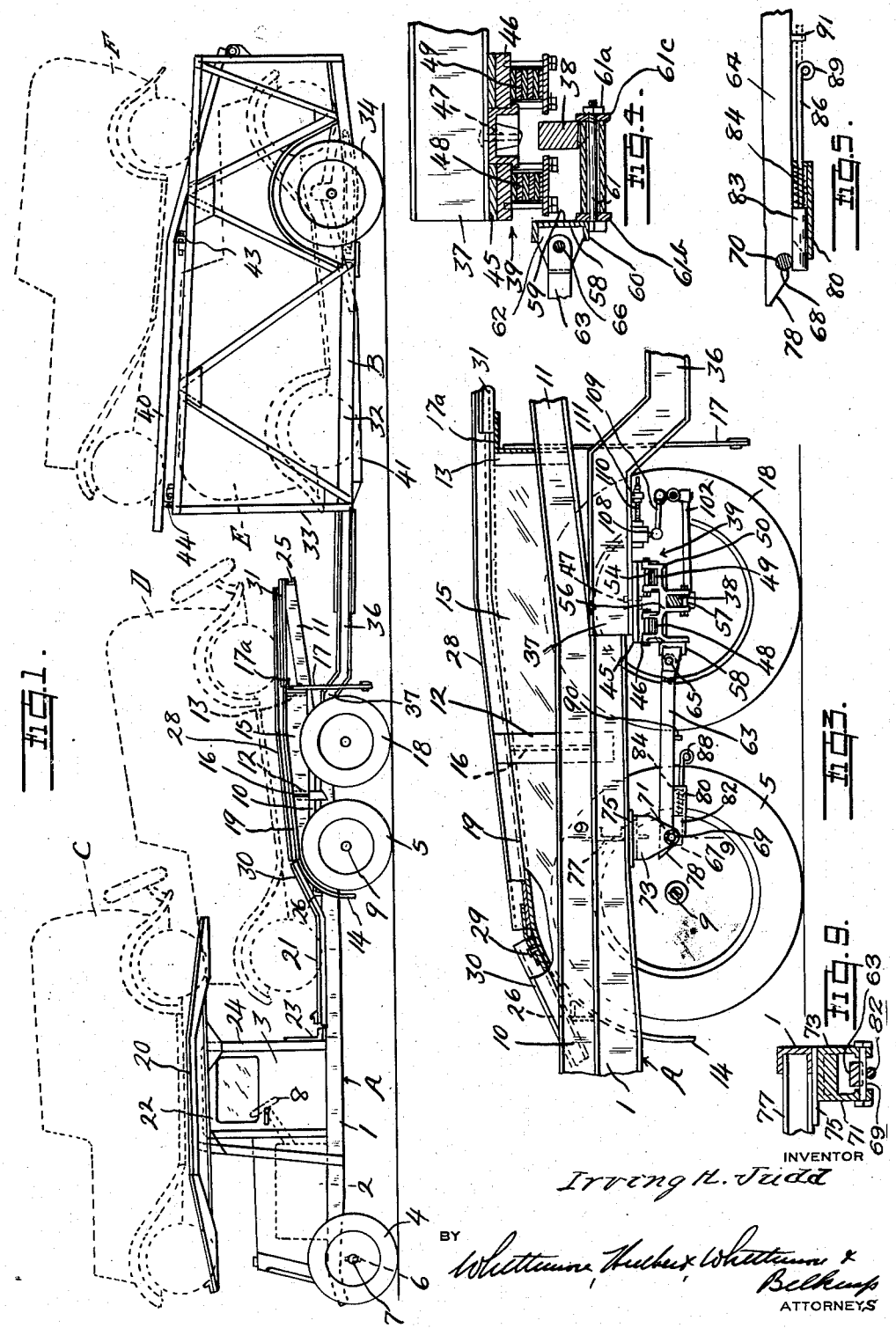
INVENTOR
Irving H. Judd
BY
ATTORNEYS June 11, 1935.  I. H. JUDD  2,004,437
TRUCK TRAILER COMBINATION
Original Filed Dec. 4, 1933    2 Sheets-Sheet 2
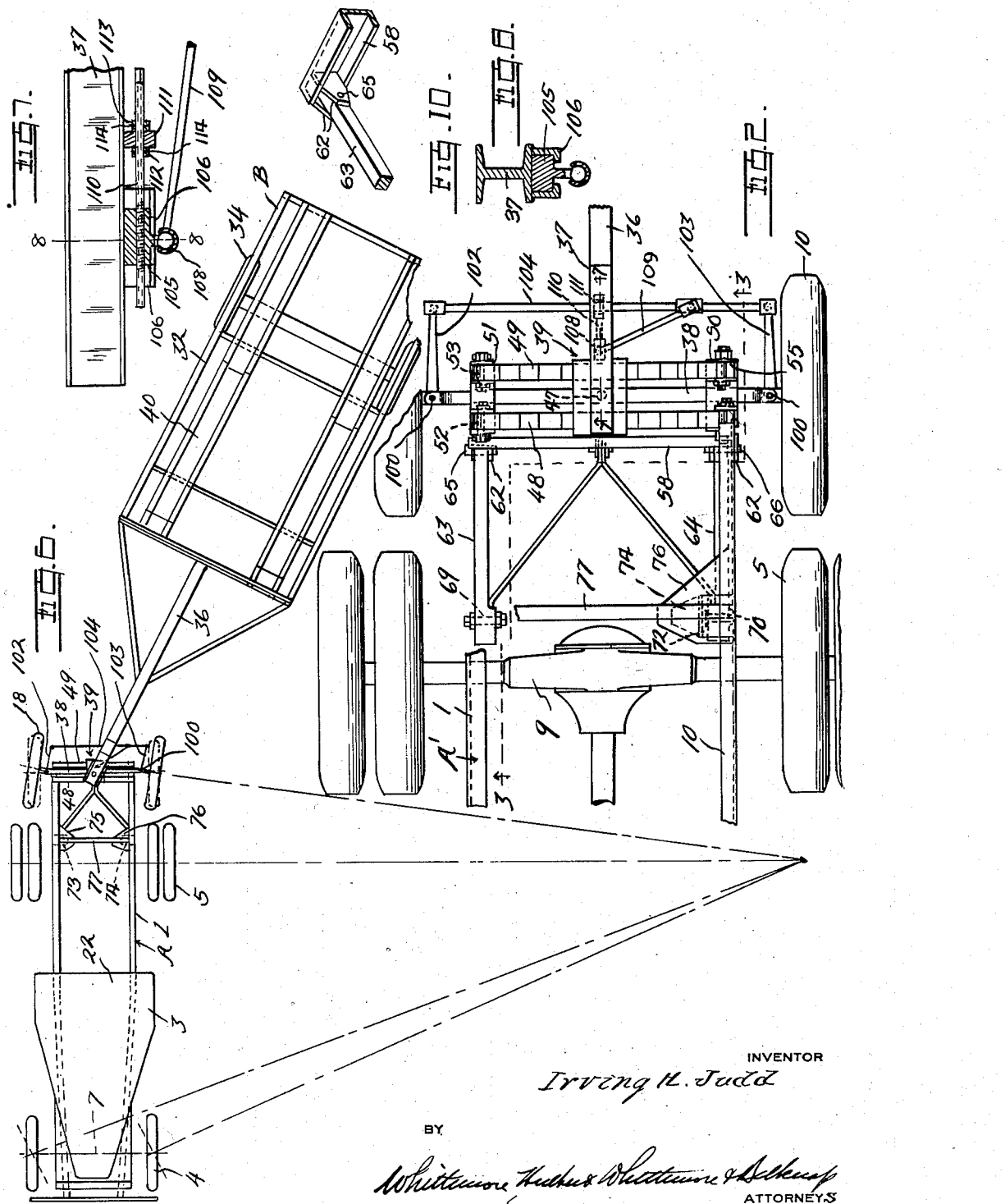
INVENTOR
Irving H. Judd
BY
ATTORNEYS Patented June 11, 1935

2,004,437

UNITED STATES PATENT OFFICE 2,004,437

TRUCK TRAILER COMBINATION

Irving H. Judd, Detroit, Mich., assignor to Whitehead & Kales Company, River Rouge, Mich., a corporation of Michigan Original application December 4, 1933, Serial No. 700,923. Divided and this application May 7, 1934, Serial No. 724,386

10 Claims. (Cl. 280—33.55)

This invention relates generally to means for transporting automobiles especially truck-trailer combinations, and constitutes a division of my application filed December 4, 1933, bearing Serial No. 700,923.

One of the essential objects of the invention is to provide a truck-trailer combination wherein the trailer is provided with means for making the front wheels thereof track or move in an arc coincident with the center of the turning arc of the front wheels of the truck so that the tires on the front wheels of the trailer will be prevented from scrubbing the road and unduly wearing out.

Another object is to provide a combination of the type described wherein the turning movement of the steering wheels of the trailer may be adjusted according to the wheel base of the truck to which it is connected.

Another object is to provide means for holding or maintaining the adjustment just mentioned once it is made.

Other objects, advantages and novel details of construction of this invention will be made more apparent as this description proceeds, especially when considered in connection with the accompanying drawings, wherein:

Figure 1 is a side elevation of a truck-trailer combination embodying my invention;

Figure 2 is a fragmentary top plan view thereof with parts broken away and in section;

Figure 3 is a sectional view taken substantially on the line 3—3 of Figure 2 with parts broken away;

Figure 4 is an enlarged vertical sectional view through the fifth wheel assembly and associated parts;

Figure 5 is a fragmentary elevation of one of the draw bars and associated latch mechanism showing the pin 70 in operative latched position;

Figure 6 is a top plan view of the combination;

Figure 7 is a fragmentary sectional view taken substantially on the line 7—7 of Figure 2;

Figure 8 is a sectional view taken substantially on the line 8—8 of Figure 7.

Figure 9 is a vertical sectional view taken substantially on the line 9—9 of Figure 3;

Figure 10 is a fragmentary perspective view of the cross bar 58, draw bar 63 and connections therebetween.

Referring now to the drawings, A is the truck and B is the trailer of a combination embodying my invention. As shown, the truck A has a chassis frame 1 carrying an engine 2 and a driver's cab 3 and provided with front and rear ground-engaging wheels 4 and 5 respectively. As usual, the front wheels 4 are mounted on spindles 6 pivotally connected to the front axle 7 and operable from a suitable steering wheel 8 within the cab. The rear wheels 5 are preferably dual wheels at opposite ends of the rear axle 9 and are adapted to be driven in the usual way from the engine 2.

10 is an auxiliary frame mounted on and having a portion 11 inclining upwardly and rearwardly from the chassis frame 1. 12 and 13 respectively are uprights rigid with and projecting above the auxiliary frame 10, 14 are wheel fenders disposed upon the outer sides of and having depending portions 15 rigid with the uprights 12 and 13, and 16 are reinforcing gussets for the fenders. In this connection it will be noted that the fenders 14 are elongated in form so as to cover the front wheels 18 of the trailer as well as the rear wheels 5 of the truck, the rear end portions 17 of said fenders being formed of flexible or yieldable material such as rubber, rubber composition or weighted canvas and normally hanging in a vertical plane from an angle crossbar 17a rigid with the top portions 19 of said fenders. Thus, the flexible portions 17 will afford clearance when the trailer is being coupled or uncoupled. Moreover, the tops 19 of such fenders are slightly inclined as shown instead of being curved longitudinally.

Preferably the truck A is designed to carry two automobiles and for this purpose is provided with upper and lower tracks 20 and 21 respectively. As shown, the upper track 20 is mounted on and extends forwardly and rearwardly beyond the top 22 of the cab, while the lower track 21 is mounted on and extends forwardly and rearwardly beyond the inclined portions 19 of the wheel fenders. The upper track 20 is preferably of sufficient length to carry a 119" wheel base automobile C while the lower track 21 is sufficiently long to carry a 136" wheel base automobile D. In this connection it will be noted that the upper and lower tracks 20 and 21 are staggeredly arranged and that the lower track 21 extends from an angle iron 23 that crosses the chassis frame 1 at the back 24 of the cab to a channel crossbar 25 at the rear end of the auxiliary frame 10. Angle irons 26 project laterally from the auxiliary frame 10 in advance of the fenders 14 and cooperate with the angle iron 23 to support the track 21, while the angle bar 17a cooperates with the crossbar 25 to support the track. To facilitate loading of the upper track 20, an intermediate portion 28 of the lower track 21 is used as a skid between the tracks 21 and 20. Normally, this portion 28 is bolted at 29 to the inclined portion 30 of the lower track and is nested in the rear portion 31 of said track. However, when it is desired to load or unload the upper track 20, the portion 28 is detached from the inclined portion 30 of the lower track and is fastened to the rear end of the upper track, as illustrated in Figure 2.

The trailer B has a chassis frame 32 carrying upright side frames 33 and provided with front and rear ground-engaging wheels 18 and 34 respectively. Preferably, the chassis frame 32 at the forward ends of the upright side frames is Y-shaped in plan and the stem 36 of the Y has an upwardly offset portion 37 at its forward end extending over and connected to the front axle 38 of the trailer by a fifth wheel 39. The trailer B also carries two automobiles and for this purpose has upper and lower tracks 40 and 41 respectively which may be loaded by skids (not shown) from the ground. Preferably the lower track 41 is carried by the chassis frame 32 between the upright side frames 33 and is sufficiently long to carry a 130'' wheel base automobile E, while the upper track 40 is carried by hingedly mounted crossbars 43 and 44 respectively on the side frames 33 and is sufficiently long to carry a 136'' wheel base automobile F.

Preferably the upper plate 45 of the fifth wheel 39 is rigid with the offset portion 37 of the frame, while the lower plate 46 of said fifth wheel is connected to the upper plate 45 by a king pin 47 and is rigid with the centers of transversely extending leaf springs 48 and 49 respectively, terminally engaging suitable brackets 50 and 51 respectively rigid with the front axle 38 of the trailer. As shown, the springs 48 and 49 are fastened by bolts 52 and 53 respectively to the brackets 51 and have slip engagement with suitable slots 54 and 55 respectively in the brackets 50. Preferably both brackets 50 and 51 have inverted U-shaped portions 56 straddling the axle 38 and fastened thereto by bolts 57.

58 is a channel crossbar in advance of the brackets 50 and 51 and disposed parallel to the axle 38. Preferably the base 59 of the channel 58 bears against and is secured to the front faces of the brackets 50 and 51, while the lower side 60 of said crossbar is connected to the axle 38 by a bolt 61 and nut 61a, suitable brackets 61b and 61c being welded to the crossbar 58 and axle 38 respectively and receiving said bolt. A tube 61d is sleeved upon the bolt 61 between said brackets and serves as a spacer.

62 are parallel plates secured in the channel crossbar 58 at opposite ends thereof, 63 and 64 respectively are parallel draw bars connected by horizontal pivot pins 65 and 66 respectively to said parallel plates 62 and having transversely extending slots 67 and 68 respectively therein at their forward ends for receiving horizontal pins 69 and 70 respectively carried by bifurcated portions 71 and 72 respectively of brackets 73 and 74 respectively rigid with gussets 75 and 76 respectively welded to the crossbar 77 of the chassis frame 1 of the truck. As shown, the draw bars 63 and 64 are movable forwardly and rearwardly in the bifurcated portions 71 and 72 over the pins 69 and 70 and have beveled faces 78 to facilitate engagement with and removal from the pins. Bosses 80 respectively are fixed to the undersides of the draw bars 63 and 64 and contain large bolts or plungers 82 and 83 respectively which are normally held forwardly across the slots 67 and 68 by coil springs 84 and are retractable by manually operable pull rods 86. Preferably these pull rods 86 are swivelly connected to the latch bolts 82 and 83 so that they may be turned ninety degrees and have eyes 88 and 89 respectively at their rear ends that may be engaged with pins 90 and 91 respectively projecting downwardly from the draw bars 63 and 64 when it is desired to retain the latch bolts 82 and 83 in retracted position.

Preferably the trailer B is provided with means that may be adjusted to make the front wheels thereof track or move in an arc coincident with the center of the turning arc of the front wheels 8 of the truck A so that the tires on the front wheels 18 of the trailer will be prevented from scrubbing the pavement or unduly wearing out. As shown, the front wheels 18 of the trailer are carried by spindles 100 pivotally connected to the front axle 38 at opposite ends thereof. Arms 102 and 103 respectively project rearwardly from the spindles 100 and are connected by a transversely extending rod 104. A block 105 is slidably mounted in guides 106 fixed to the under side of the offset portion 37 of the stem 36 of the Y portion of the trailer frame and has a depending knob 108 connected by a link 109 to the rod 104. Any suitable means such as the screw 110 journaled in a depending lug 111 of the frame and threadedly engaging the block 105 may be used to move the block longitudinally in the guides 106 to vary the steering movement of the front wheels 18 of the trailer, while any suitable means such as the collars 112 and 113 respectively fastened on the screw 110 by pins 114 in front and in rear of the lug 111 may be used to hold the screw 110 against shifting longitudinally of the offset portion 37 of the stem 36 of the Y portion of the trailer frame. Thus, rotation of the screw 110 causes block 105, depending knob 108 and the inner end of link 109 to move longitudinally of the offset portion 37 of the stem 36 of the Y portion of the trailer frame relative to king pin 47. In use, the adjustment of the screw 110 is governed by the wheel base of the truck to which the trailer is connected. If the trailer is connected to a truck having a short wheel base, then the screw 110 would be adjusted to make the wheels 18 turn sharply, whereas the screw 110 would be adjusted to make the wheels 18 turn slightly if the trailer B was connected to a truck having a long wheel base. Thus, the front wheels 18 of the trailer may be made to track on an arc coincident with the center of the turning arc of the front wheels of the truck to which it is connected.

What I claim as my invention is:

1. A truck-trailer combination comprising a truck having front and rear wheels and steering mechanism for said front wheels, a trailer having front and rear wheels, a connection between said vehicles holding the front wheels of the trailer in tandem relation with the rear wheels of the truck while permitting them to turn, and means carried by the trailer and entirely independent of the steering mechanism for the front wheels of said truck for making the front wheels of the trailer turn in an arc coincident with the center of the turning arc of the front wheels of the truck.

2. A truck-trailer combination comprising a truck having front and rear axles, ground wheels carried by said axles, steering mechanism for the wheels carried by the front axle of the truck, a trailer having front and rear axles, and ground wheels carried by said axles, a connection between said vehicles operable to constantly hold the front axle of the trailer parallel to the rear axle of the truck, and means carried by the trailer and operable entirely independent of the steering mechanism for the front wheels of said truck while the truck is turning to make the front wheels of the trailer track with the wheels of the truck.

3. A truck-trailer combination comprising a truck having front and rear wheels and steering mechanism for said front wheels, a trailer having front and rear wheels, a connection between said vehicles holding the front wheels of the trailer in tandem relation with the rear wheels of the truck while permitting them to turn in an arc substantially coincident with the center of the turning arc of the wheels of the truck, and means carried by the trailer and operable entirely independent of the steering mechanism for the front wheels of said truck to make the front wheels of the trailer turn as aforesaid.

4. A truck-trailer combination comprising a trailer having a chassis frame, a transversely extending axle at the forward end of said frame, a fifth wheel connection between said frame and axle, steering wheels for the trailer connected to the forward axle, a truck in advance of the trailer provided at its forward end with steering wheels and having a transversely extending axle at its rear end, means independently of the fifth wheel connection for connecting the trailer to the truck, said means being operable to constantly hold and maintain the forward axle of the trailer in substantially parallel relation with the rear axle of the truck, and means associated with the chassis frame and steering wheels of the trailer and operable during turning movement of the truck to make the steering wheels of the trailer turn relative to the forward axle of the trailer in an arc coincident with the center of the turning arc of the steering wheels of the truck.

5. A truck-trailer combination comprising a trailer having a chassis frame provided at its forward end with ground-engaging steering wheels, a truck in advance of the trailer provided at its forward end with ground-engaging steering wheels, means connecting the trailer to the truck, means associated with the chassis frame and steering wheels of the trailer and operable during turning movement of the truck to make the steering wheels of the trailer turn in an arc coincident with the center of the turning arc of the steering wheels of the truck, and means for adjusting the steering movement of the steering wheels of the trailer according to the wheel base of the truck to which it is connected.

6. A truck-trailer combination comprising a trailer having a chassis frame provided at its forward end with ground-engaging steering wheels, a truck in advance of the trailer provided at its forward end with ground-engaging steering wheels, means connecting the trailer to the truck, a connection between the chassis frame and steering wheels of the trailer operable during turning movement of the truck to make the steering wheels of the trailer turn in an arc coincident with the center of the turning arc of the steering wheels of the truck, means for adjusting the steering movement of the steering wheels of the trailer according to the wheel base of the truck to which it is connected, and means for holding or maintaining the adjustment just mentioned once it is made.

7. A truck-trailer combination comprising a trailer having a chassis frame, a transversely extending axle at the forward end thereof, a fifth wheel connection between said frame and axle, wheel spindles pivotally connected to said axle at opposite ends thereof, ground-engaging steering wheels for the trailer carried by said spindles, a truck in advance of the trailer provided at its forward end with ground-engaging steering wheels and provided at its rear end with a transversely extending axle having ground-engaging wheels, means independent of the fifth wheel connection for connecting the trailer to the truck, said means being operable to constantly hold and maintain the forward axle of the trailer in substantially parallel relation with the rear axle of the truck, and a connection between the chassis frame and steering wheels of the trailer operable during turning movement of the truck to make the steering wheels of the trailer turn relative to the forward axle of the trailer in an arc coincident with the center of the turning arc of the steering wheels of the truck, including arms respectively projecting rearwardly from the spindles, a transversely extending rod connected to said arms, a block carried by and adjustable relative to the chassis frame of the trailer, and a link terminally connected to said block and rod.

8. In a trailer steering mechanism, the combination with a trailer chassis, a transversely extending axle at the forward end of said chassis frame and movable relative thereto, a fifth wheel connection between the chassis frame and axle, steering wheel spindles connected to the axle at opposite ends thereof, ground-engaging steering wheels for the trailer carried by said spindles, and a connection between the chassis frame and steering wheels operable to make the said wheels turn relative to the axle upon movement of the said axle relative to said chassis frame, including arms rigid with and projecting rearwardly from said spindles, a transversely extending rod connected to said arms, a block adjustable longtudinally of the chassis frame, a link terminally connected to said block and rod, and means carried by the chassis frame for adjusting said block to vary the steering movement of the steering wheels.

9. In a trailer steering mechanism, the compination with a trailer chassis, a transversely extending axle at the forward end of said chassis frame and movable relative thereto, a fifth wheel connection between the chassis frame and axle, steering wheel spindles connected to the axle at opposite ends thereof, ground-engaging steering wheels for the trailer carried by said spindles, and a connection between the chassis frame and steering wheels operable to make the said wheels turn relative to the axle upon movement of said axle relative to said chassis frame, including arms rigid with and projecting rearwardly from said spindles, a transversely extending rod connected to said arms, a block adjustable longitudinally of the chassis frame, a link terminally connected to the rod and block, guide means for said block, a lug rigid with the chassis frame adjacent said guides, and to means for adjusting said block in said guides to vary the steering movement of said steering wheels, including a screw journaled in said lug and threadedly engaging said block.

10. In a trailer steering mechanism, the combination with a trailer chassis, a transversely extending axle at the forward end of said chassis frame and movable relative thereto, a fifth wheel connection between the chassis frame and axle, steering wheel spindles connected to the axle at opposite ends thereof, ground-engaging steering wheels for the trailer carried by said spindles, and a connection between the chassis frame and steering wheels operable to make the said wheels turn relative to the axle upon movement of said axle relative to said chassis frame, including arms rigid with and projecting rearwardly from said spindles, a transversely extending rod connected to said arms, a block adjustable longitudinally of the chassis frame and having a depending spherical portion, a link terminally connected to said spherical portions and rod, and means carried by the chassis frame for adjusting said block to vary the steering movement of the steering wheels.

IRVING H. JUDD.